US011159502B2

(12) United States Patent
Liu

(10) Patent No.: US 11,159,502 B2
(45) Date of Patent: Oct. 26, 2021

(54) LIGHTWEIGHT KEY EXCHANGE PROTOCOL

(71) Applicant: University Of North Dakota, Grand Forks, ND (US)

(72) Inventor: Jun Liu, Grand Forks, ND (US)

(73) Assignee: University of North Dakota, Grand Forks, ND (US)

( * ) Notice: Subject to any disclaimer, the term of this patent is extended or adjusted under 35 U.S.C. 154(b) by 234 days.

(21) Appl. No.: 16/608,518

(22) PCT Filed: Apr. 27, 2018

(86) PCT No.: PCT/US2018/029587
§ 371 (c)(1),
(2) Date: Oct. 25, 2019

(87) PCT Pub. No.: WO2018/200824
PCT Pub. Date: Nov. 1, 2018

(65) Prior Publication Data
US 2021/0306307 A1      Sep. 30, 2021

Related U.S. Application Data

(60) Provisional application No. 62/491,595, filed on Apr. 28, 2017.

(51) Int. Cl.
*H04L 29/06* (2006.01)
*H04L 9/14* (2006.01)

(52) U.S. Cl.
CPC .............. *H04L 63/061* (2013.01); *H04L 9/14* (2013.01)

(58) Field of Classification Search
CPC .................................. H04L 63/08; H04L 9/14
USPC ........................................................ 713/171
See application file for complete search history.

(56) References Cited

U.S. PATENT DOCUMENTS

| 5,325,433 | A  | * | 6/1994 | Torii ..................... H04L 9/0863 380/282 |
| 2008/0069344 | A1 |   | 3/2008 | Yao et al. |
| 2010/0020964 | A1 | * | 1/2010 | Horie ..................... G06F 7/725 380/44 |

(Continued)

OTHER PUBLICATIONS

International Search Report and Written Opinion from PCT Application Serial No. PCT/US2018/029587, dated Aug. 13, 2018, 10 pages.

(Continued)

*Primary Examiner* — Jacob Lipman
(74) *Attorney, Agent, or Firm* — Kinney & Lange, P.A.

(57) ABSTRACT

A system and method include an encryptor, a decryptor, and a communication link. The encryptor includes a first processor and a first memory, and the decryptor includes a second processor and a second memory. The encryptor and the decryptor communicate data via the communication link. The encryptor and the decryptor are configured to: exchange public messages comprising keying materials, and calculate a common key based on the keying materials, first private modular integers known only to the encryptor, and second private modular integers known only to the decryptor. The keying materials disclosed in the public messages form an under-determined system of equations in variables of the first and the second private modular integers.

18 Claims, 3 Drawing Sheets

(56) References Cited

U.S. PATENT DOCUMENTS

| | | |
|---|---|---|
| 2010/0058059 A1 | 3/2010 | Schneider |
| 2011/0103583 A1 | 5/2011 | Voon et al. |
| 2015/0010153 A1* | 1/2015 | Robertson .............. H04K 3/226 380/270 |
| 2016/0242030 A1 | 8/2016 | Pang et al. |
| 2017/0005792 A1 | 1/2017 | Rietman et al. |

OTHER PUBLICATIONS

International Preliminary Report on Patentability for PCT Application Serial No. PCT/US2018/029587, dated Nov. 7, 2019, 7 pages.

* cited by examiner

LIGHTWEIGHT KEY EXCHANGE PROTOCOL

CROSS-REFERENCE TO RELATED APPLICATION(S)

This application claims the benefit of U.S. Provisional Application No. 62/491,595 filed Apr. 28, 2017 for "Lightweight Key Exchange Protocol."

BACKGROUND

The present disclosure relates generally to encryption, and in particular to a method of performing a lightweight key exchange.

Machine-type communications (MTC) enable a broad category of applications ranging from mission-critical applications to business-critical applications. Potential applications include health care, supply chain, manufacturing, process automation, energy, and utilities. MTC refer to automated data communications among devices and the underlying data transport infrastructure. MTC can adopt different network technologies, from point-to-point wireless networks, to multi-hop wireless networks, to wireless mesh networks, to cellular networks. In particular, the ubiquitous presence of cellular systems provides widespread coverage, reliable communication links, and mobility support to MTC. The widespread deployment of cellular-based MTC requires that the further development of the cellular systems effectively addresses the new technical challenges raised by the distinct requirements of the MTC-based applications.

MTC-based applications impose very different requirements on cellular systems and MTC devices than human-to-human (H2H) communications on aspects of traffic patterns, security requirements, and processing capability and power resource of the devices. In H2H communications, traffic is characterized as bursts of data traffic on downlink during active periods. Cellular systems are mainly designed and optimized to serve the traffic of H2H communications. In comparison, MTC devices typically generate small and infrequent data traffic, and the aggregation of the traffic from individual MTC devices may impose infrequent but high-volume uplink-centric data transmissions, e.g., in the metering applications. Most MTC devices typically have limited computational or power resources because that they are typically required to be small, inexpensive, and able to operate unattended for extended periods of time. Low power consumption is vital for the operation of the battery-powered MTC devices. Unattended operation of MTC devices introduces a number of unique security vulnerabilities for the MTC devices and the wireless networks over which they communicate.

Security is a critical enabler for the MTC-based applications. MTC security is expected to address the concerns of confidentiality, integrity, privacy, authentication, and authorization for the end-to-end communications. Protection of the confidentiality of communication is of particular importance because protecting the privacy of data and identity is critical in many MTC applications. Data collected from the MTC devices are often sensitive. Identity of a MTC device is also sensitive since it is often used for authentication and authorization purposes. Additionally, the identities of MTC devices can be used by adversaries to track the devices or their usages if they are transmitted in clear forms. Hence, confidential communication is the foundation for many types of security protections. It is an essential requirement that it is impossible to acquire information about the data or identities stored on the MTC devices by eavesdropping on the network.

Despite various security algorithms have been introduced to protect the security of cellular-based MTC, such as the standardization of Long Term Evolution (LTE), they may not be readily used on low-cost MTC devices due to constrained resources and limited computational power. First, the economics of MTC do not allow a security provisioning process similar to that of cellular handsets to be adopted. In many MTC-based applications, relatively low revenue streams are generated from each device to the various players involved because each MTC device of a very large group of devices only contributes a small amount of data. Second, special implementation of conventional cryptographic algorithms is required for MTC devices to guard against potential side-channel attacks. Since MTC devices are often unattended, there is a higher risk of potential side-channel attacks, such as simple or differential power analysis which infers the data calculated by a processor by analyzing electromagnetic emissions. Third, sufficient cryptographic functions are difficult to implement on the resource-constrained MTC devices. Moreover, the intensive computations required in the conventional cryptographic solutions cannot be effectively performed on the resource and power constrained MTC devices. Hence, the conventional cryptographic solutions are not suitable solutions for protecting the security and privacy of MTC.

Encryption/Decryption schemes are the essential building blocks for protecting the confidentiality of data. The confidentiality of data is protected by encrypting the plain form of the data using an encryption key into a scrambled form called the cipher text. Restoring the plain form of the data from the scrambled form is guaranteed only with the correct decryption key. Encryption/Decryption schemes can be categorized into symmetric-key schemes and asymmetric-key schemes. Symmetric-key cryptographic schemes are generally preferable to asymmetric-key schemes in that the former impose a relatively lighter computational and communication overhead than the latter. Key Exchange (KE) protocols have to be used together with the symmetric-key cryptographic schemes to allow a pair of encryptor and decryptor to agree upon a shared key that is used to protect the confidentiality of data in a communication session. The difficulty of key agreement between two parties lies in that the key agreement has to be performed over an insecure communication channel. The common secrecy shared between two parties should be easily calculated by the two parties, while it should be very difficult for an adversary to calculate the key based on the information disclosed in the key exchange. A well-known example of key agreement is the Diffie-Hellman (DH) algorithm.

Lightweight key exchange mechanisms alongside lightweight encryption/decryption are needed to protect the privacy of data in MTC. The conventional cryptographic solutions are not suitable for protecting security and privacy for MTC-based applications for two main reasons. First, sufficient cryptographic functions are difficult to implement on resource-constrained smart devices. Second, the intensive computations required in the conventional cryptographic solutions cannot be effectively performed on the resource-constrained smart devices. Lightweight security solutions are needed to protect the security and privacy of data transmitted in cloud-assisted networking. Lightweight refers to the fact that only simple modular arithmetic operations are involved in the key agreement. Only modular additions/subtractions and modular multiplications are used in the key exchange mechanism without relying on expensive exponentiation calculations.

SUMMARY

A method of performing a key exchange between a first computing system and a second computing system includes: implementing a message exchange scheme between the first and second computing system, wherein each of the first and second computing systems include at least a processor and a memory; generating, by the first computing system, first private modular integers that remain undisclosed to any other party; generating, by the second computing system, second private modular integers that remain undisclosed to any other party; calculating, by each of the first and the second computing systems, a number of keying materials; exchanging the keying materials as public messages between the first and second computing system, wherein the collection of the public messages form an underdetermined system of equations in variables of the first and the second private modular integers; and calculating, by the first and the second computing systems, the common key based on the public messages, and the first and the second private modular integers.

A system includes an encryptor, a decryptor, and a communication link. The encryptor includes a first processor and a first memory, and the decryptor includes a second processor and a second memory. The encryptor and the decryptor communicate data via the communication link. The first and the second memories are encoded with instructions that when executed by the first and the second processors, respectively, cause the encryptor and the decryptor: exchange public messages comprising keying materials, and calculate a common key based on the keying materials, first private modular integers known only to the encryptor, and second private modular integers known only to the decryptor. The public messages comprise an under-determined system of equations in variables of the first and the second private modular integers.

DETAILED DESCRIPTION

Figure 1:
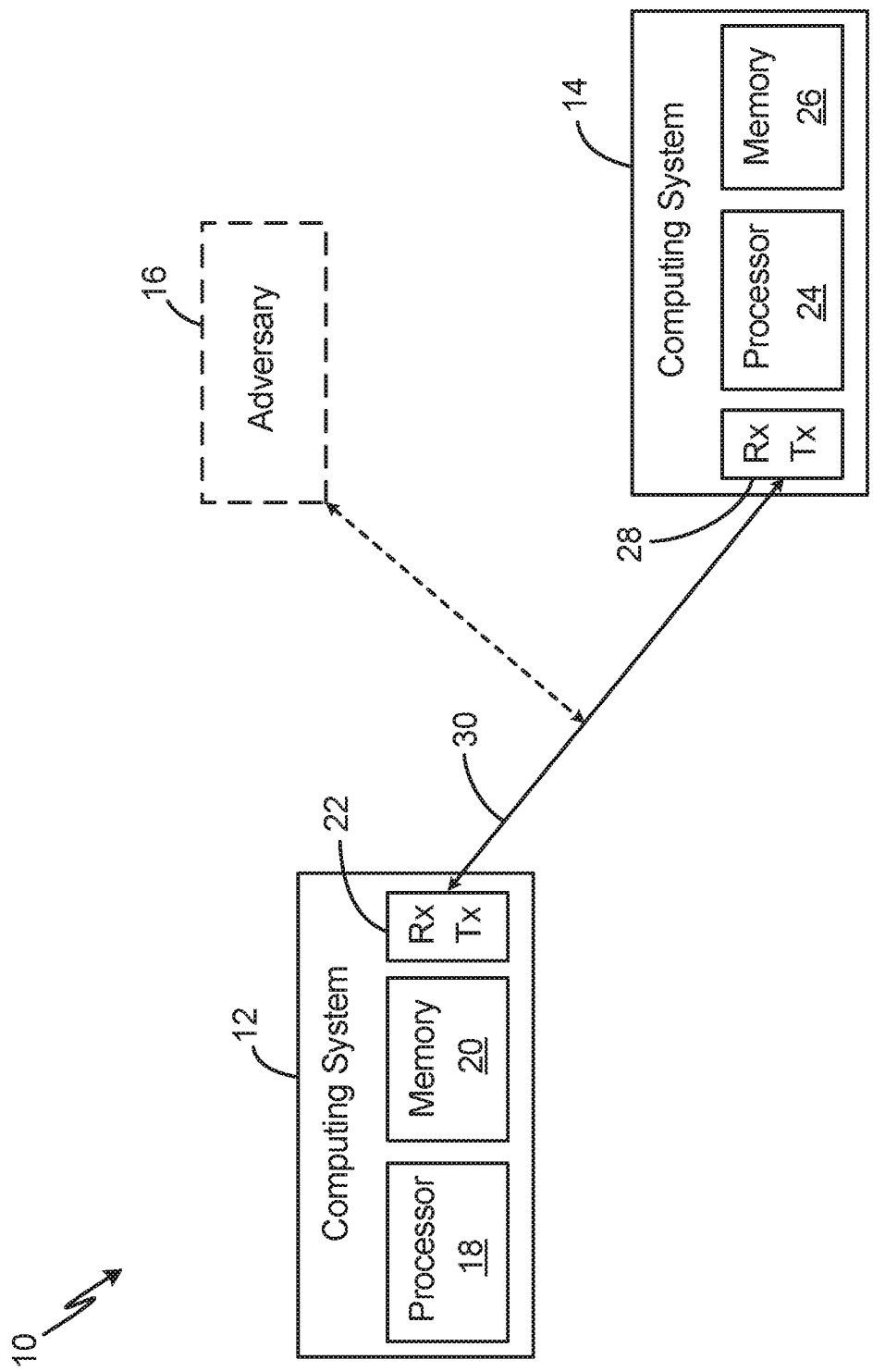
FIG. 1 is a block diagram illustrating a system that implements a lightweight key exchange protocol.

A method of agreeing upon a shared secrecy between a first computing system and a second computing system is disclosed herein. We consider the scenario in which two parties perform confidential communications over an insecure channel. A symmetric-key cryptographic primitive is adopted to protect the confidentiality of the communication. A common key is required to be agreed upon between the two parties through a key exchange mechanism. Using the common key, the encryptor first encrypts a plaintext message into a ciphertext message and then sends the ciphertext messages to the decryptor. The decryptor restores plaintext messages from ciphertext messages using the same key. An adversary is assumed to intercept the messages exchanged between the pair of encryptor and decryptor. The decryptor can easily use the common key to restore the plaintext messages from ciphertext messages, while it is difficult for an adversary to recover the plaintext messages from the intercepted ciphertext messages without the knowledge of the common key. The key exchange (KE) protocol disclosed herein supports secure key agreement between two honest parties. Secure key agreement refers to covertly and privately making a shared secrecy agreed upon by two honest parties. Covert agreement of a shared key refers to the requirement that only a pair of honest parties can derive a shared secret value individually, while other parties cannot determinatively derive the value of the shared secrecy. Privately agreeing upon a shared secrecy refers to the requirement that the private values used by either honest party in the key agreement cannot be inferred by the counter party.

The method of agreeing upon a common key includes two major components. The first component is a message exchange scheme, and the second component is a key calculation scheme. The message exchange scheme is crafted to allow two computing systems to send some keying materials to their counter parties. The key calculation scheme allows each computing system to covertly calculate a common key by making a joint use of its own private values and the keying materials received from the counter party. Covertly agreeing upon a shared secrecy between two honest parties is based on the inexistence of a unique solution of an under-determined system of equations. The messages exposed to other parties than the two computing systems present an under-determined system of equations which has many sets of solutions. The private values used by the individual honest parties is only one of those sets of solutions. Without being able to find the unique solution (representing the private values used by the individual honest parties) of the under-determined system of equations, other parties are unable to calculate the same value of the common key as the two computing systems. Meanwhile, the two computing systems involved in the key exchange process are able to calculate the value of the common key with their respective knowledge of the private, individually chosen, values.

FIG. 1 is a block diagram illustrating system 10 that implements a lightweight key exchange protocol. System 10 includes first computing system 12, second computing system 14, and adversary 16. First computing system 12 includes processor 18, memory 20, and receiver/transmitter 22. Second computing system 14 includes processor 24, memory 26, and receiver/transmitter 28. First computing system 12 communicates with second computing system 14 over communication link 30.

First computing system 12 and second computing system 14 are any devices capable of processing data, and communication with other devices such as, but not limited to, mobile devices, tablets, personal computers, servers, or any other computing system. Communication link 30 may be any wired or wireless link. Processors 18 and 24 are any electronic components capable of executing a key exchange protocol. For example, processors 18 and 24 may be microprocessors capable of executing instructions stored in respective memories 20 and 26. Memories 20 and 26 may be any volatile or non-volatile memories. Receiver/transmitters 22 and 28 are any interfaces capable of facilitating communication on communication link 30. For example, receiver/transmitters 22 and 28 may be wireless transceivers that facilitate communication over a wireless network.

In one embodiment, at least one of first computing system 12 and second computing system 14 is a resource constrained device, and communication link 30 is a mobile network. For example, first computing system 12 may be a mobile device, and second computing system 14 may be another mobile device, a data server, or a system that interfaces with one or more data servers. In this example embodiment, first computing system 12 and second computing system 14 perform confidential communications over communication link 30, which may be an insecure communication link. A symmetric-key cryptographic primitive may be adopted to protect the confidentiality of the communication on link 30.

To protect the confidentiality of the communication using symmetric-key cryptographic solutions, a common key has to be agreed upon between the first computing system 12 and second computing system 14 using a key exchange protocol. Using the common key, first computing system 1:2, acting as the encryptor, can encrypt a plaintext message into a ciphertext message and then send the ciphertext message to second computing system 14, acting as the decryptor. Second computing system 14 decrypts the ciphertext message into the plaintext message through running a decryption algorithm which takes the common key and the ciphertext message as the input. Adversary 16, which may be any system configured to intercept communications on link 30, such as another mobile device, is assumed to intercept any messages exchanged between the first computing system 12 and second computing system 14 on communication link 30. Decryption can be easily performed by second computing system 14 using the common key, while it is very difficult for adversary 16 to recover the plaintext messages from the intercepted ciphertext messages without the knowledge of the common key.

In this example embodiment, each of first computing system 12 and second computing system 14 hold their own private values which are never disclosed on communication link 30. Derivatives, using modular arithmetic, for example, may be calculated as polynomial combinations of the private values. Some of the derivatives are exchanged between the two parties as keying materials. Each of first computing system 12 and second computing system 14 are capable of calculating the common key based on their own respective private values and the keying materials received from the counter party. In order to prevent adversary 16 from calculating the unique value of the common key, the number of keying materials disclosed between first computing system 12 and second computing system 14 is fewer than the total number of the private values used in the key exchange protocol.

Since each disclosed keying material is a polynomial combination of the private values, it can be treated as an equation in variables of the private values. When the number of equations is strictly fewer than the number of the variables, it is impossible to find the unique value for every variable. Meanwhile, the value of the common key cannot be expressed as a polynomial combination of the keying materials. Instead, the value of the common key can only be expressed as a polynomial combination of the private values and the keying materials. Hence, the common key can only be calculated by first computing system 12 and second computing system 14 using their respective private values. Without knowing the private values, adversary 16 cannot calculate the unique value of the common key, no matter how powerful its computing capability is.

Unlike other cryptographic key exchange protocols, the security of this embodiment does not rely on the believed nonexistence of efficient solutions to hard mathematical problems. Instead, the security of this embodiment is based on the known impossibility of finding the unique values for variables in a system of equations when the number of variables is greater than the number of equations. This embodiment is lightweight because it imposes a low computational load on processors 18 and 24 and low memory consumption for memories 20 and 26. The low computational load and the low memory consumption make this embodiment especially suitable for resource-constrained devices.

Figure 2:
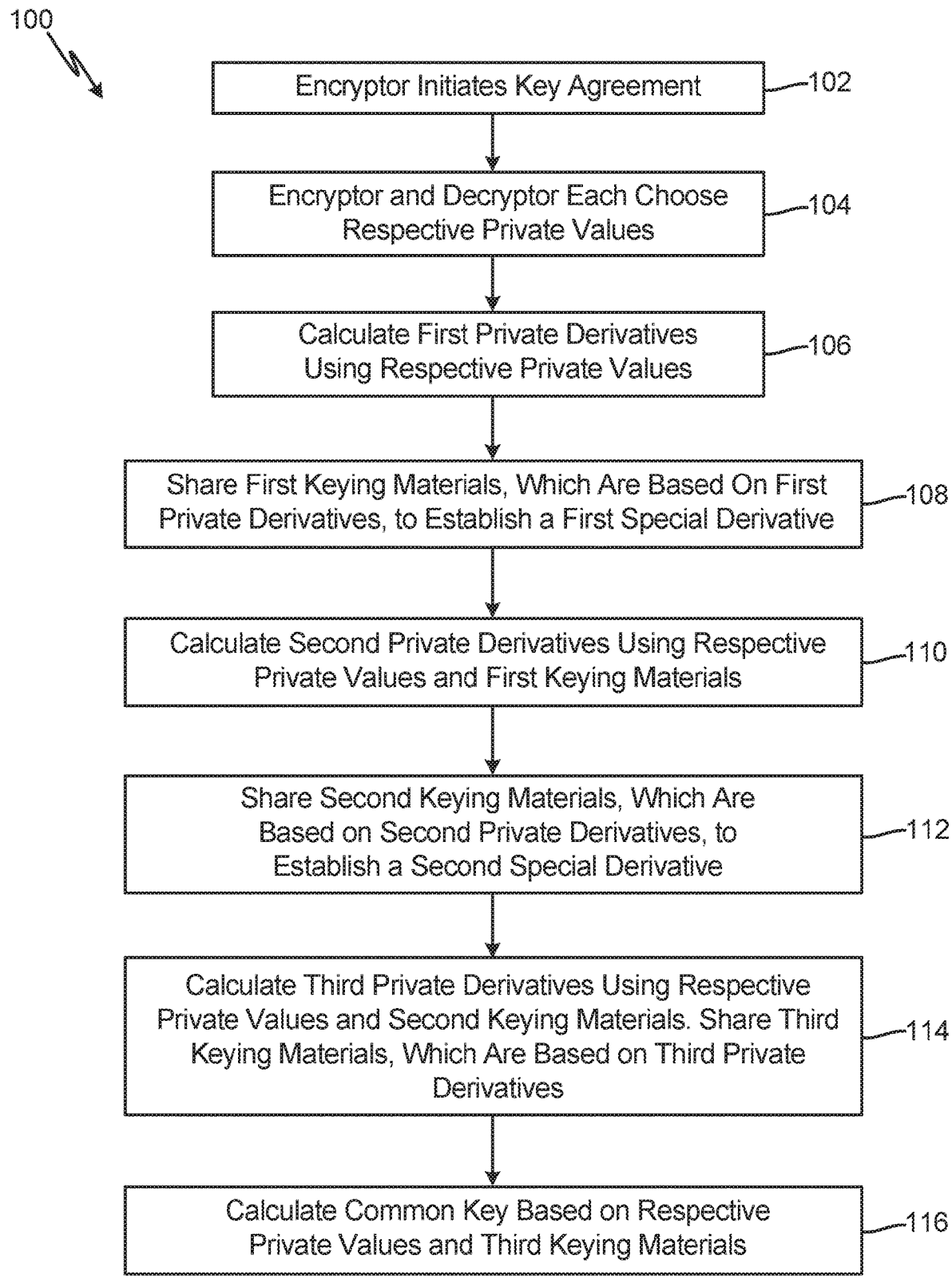
FIG. 2 is a flowchart illustrating a method of employing a lightweight key exchange protocol.

FIG. 2 is a flowchart illustrating method 100 of performing a key exchange between an encryptor and a decryptor. The encryptor may be any computer system, such as first computing system 12, that desires to encrypt data for a decryptor. The decryptor may be any computer system, such as second computing system 14, configured to receive and decrypt the encrypted message from the encryptor. A specific embodiment that follows FIG. 2 is described.

At step 102, the encryptor initiates a key agreement with the decryptor. At step 104, each of the encryptor and decryptor independently chooses its respective private values. For example, the encryptor may independently choose several private modular integers and the decryptor may independently choose several private modular integers. The number of private values is only constrained in that the number of undisclosed private values must be greater than the number of the disclosed keying materials. Each of the encryptor and decryptor strictly keeps its own private values to its own secrecy. Further, the encryptor and decryptor may employ modular arithmetic, for example, as shown in the detailed example below.

The covert and private key agreement between two honest parties requires that two special derivatives be established between the two parties. The first special derivate may be, for example, a polynomial combination of the private values from each of the encryptor and the decryptor. At step 106, to establish the first special derivative between the two parties, each of the encryptor and the decryptor calculates their respective private derivatives using their respective private modular integers. At step 108, a portion of the private derivatives, which are used to establish the first special derivative, are shared between the encryptor and the decryptor as first keying materials.

A second special derivative is also established between the encryptor and the decryptor. The second special derivative may be, for example, a polynomial combination of the first special derivative with further private values of the encryptor and the decryptor. At step 110, to establish the second special derivative, each of the encryptor and the decryptor calculates further respective private derivatives making a joint use of the first keying materials and the respective private values. At step 112, a portion of the further respective derivatives are shared between the encryptor and the decryptor as second keying materials in order to establish the second special derivative.

The values of the first and second special derivatives are not known by either party. The special derivatives are expressed as polynomial combinations of the respective private values of the encryptor and decryptor. At step 114, third keying materials are generated and exchanged between the encryptor and the decryptor that enable the encryptor and decryptor to calculate a common key. At step 116, a common key is calculated by both the encryptor and the decryptor based on their respective private integers and the disclosed keying materials.

Figure 3:
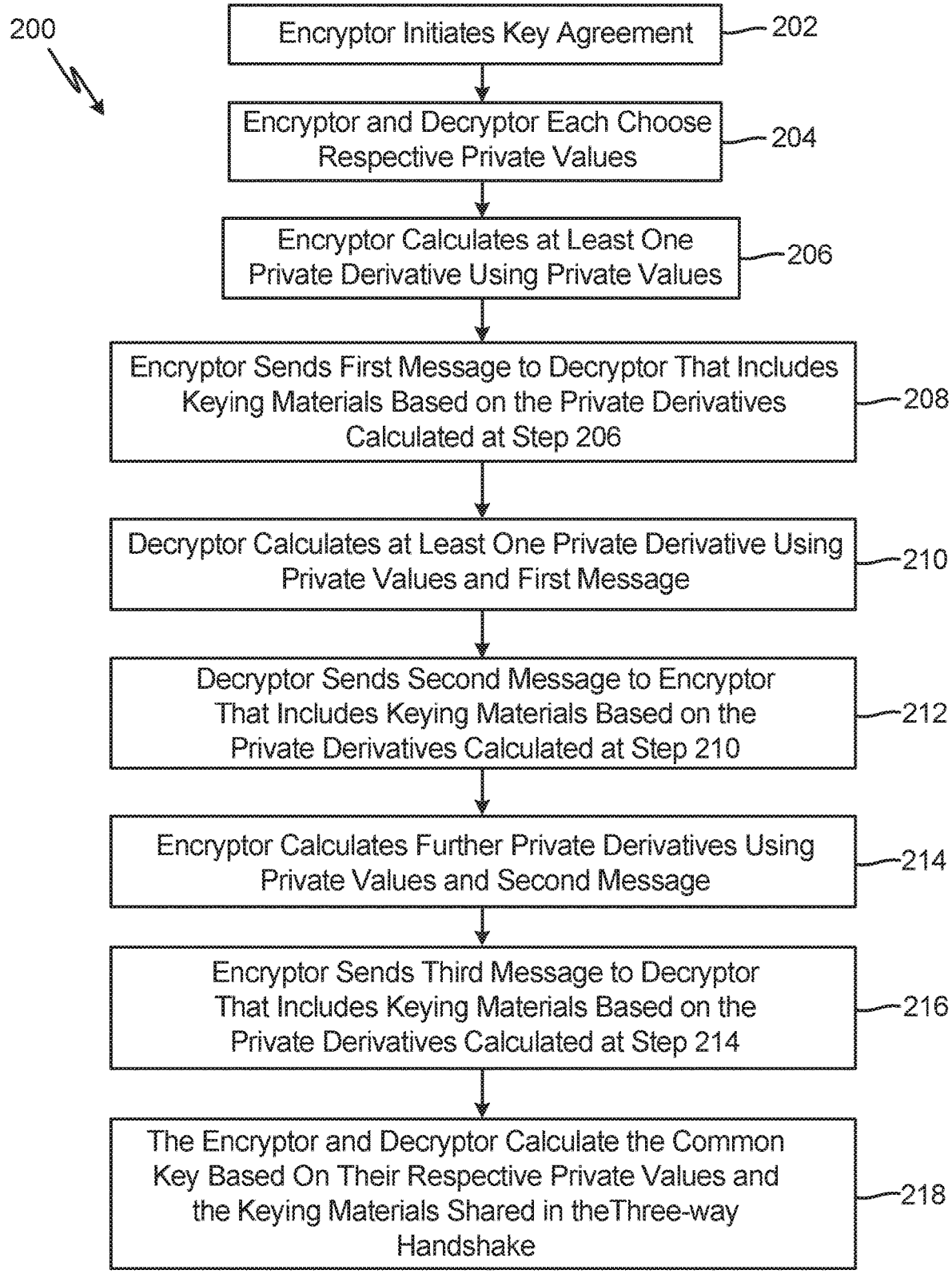
FIG. 3 is a flowchart illustrating a method of performing a three-way handshake for a lightweight key exchange protocol.

FIG. 3 is a flowchart illustrating method 200 of performing a key exchange between an encryptor and decryptor through conducting a three-way handshake. For example, the key exchange illustrated in FIG. 2 may be accomplished using only three public messages. Thus, a key exchange may be completed using a three-way handshake between the encryptor and the decryptor. An example embodiment is described in detail below. At step 202, the encryptor initiates a key exchange with the decryptor. At step 204, the encryptor and decryptor both select their respective private values that are unknown to one another. For example, since there are three public messages, the encryptor and decryptor may each choose greater than three private integers.

The encryptor calculates one or more private derivatives at step 206 based on the encryptor's private values. At step 208, the encryptor sends a first message to the decryptor that includes a keying material that is calculated based on its private derivatives described at step 206. The decryptor receives the first message and calculates its private derivatives based on the first message and the decryptor's private values at step 210. At step 212, the decryptor sends a second message to the encryptor based on the private derivates calculated at step 210. At step 214, the encryptor receives the second message and calculates further private derivatives based on the second message and the encryptor's private values. At step 216, the encryptor sends a third message to the decryptor based on the private derivatives calculated at step 214.

The common key is calculated by both the encryptor and the decryptor at step 218. The encryptor uses its private derivatives and the second message to calculate the common key. The decryptor uses its private derivatives and the third message to calculate the common key. The encryptor and decryptor are then capable of encrypted communication using the common key.

EXAMPLE EMBODIMENT

The following is a detailed embodiment for the key exchange agreement disclosed above in FIG. 2. As discussed above, the calculations involved in the key agreement may be defined based on modular arithmetic with respect to a modulus n (n being a positive integer with n>1). The value of integer n is known to every party, including adversaries. The modular value of an integer "a" with respect to a modulus n (n>1) is denoted by $[\alpha]_n \equiv a \bmod n.$ Modular arithmetic includes modular addition ($+_n$), modular subtraction ($-_n$), and modular multiplication ($\cdot_n$). These modular arithmetic operations are defined as follows:

$[\alpha]_n +_n [b]_n \equiv \{[\alpha]_n + [b]_n\} \bmod n;$ $[\alpha]_n -_n [b]_n \equiv \{[\alpha]_n - [b]_n\} \bmod n;$ $[\alpha]_n \cdot_n [b]_n \equiv \{[\alpha]_n \cdot [b]_n\} \bmod n;$ Modulus n is required to be a positive integer with n>1. Each party participating in a key agreement chooses a set of random integers and uses them as the private values. The modular value of the random integers chosen by an encryptor and a decryptor are symbolized by $[x]_n$ and $[y]_n$, respectively.

Derivatives are expressed as the polynomial combinations of the private modular integers. The derivatives calculated by the encryptor and the decryptor are symbolized by $[e]_n$ and $[d]_n$, respectively. The publicly disclosed derivatives are symbolized by $[p]_n$, and the common shared key is symbolized by $[K]_n$.

The party that initiates a key agreement (step 102, FIG. 2) is treated as an encryptor, and the counter party is treated as a decryptor. Before a key agreement begins, the two parties have to independently choose their own random integers which are used as the private values. The modular forms of the random integers, chosen by the encryptor and decryptor (step 104, FIG. 2) are denoted by:

Encryptor: undisclosed ($[x_1]_n$, $[x_2]_n$, $[x_3]_n$, $[x_4]_n$);

Decryptor: undisclosed ($[y_1]_n$, $[y_2]_n$, $[y_3]_n$, $[y_4]_n$).

Then, derivatives are calculated as polynomial combinations of the private modular integers. The security of the key agreement scheme relies on constructing special derivatives whose values are unknown to any party. The expressions of these special derivatives involve the private modular integers used by both parties. Since the private modular integers are never disclosed to other parties, the values of the special derivatives are unknown to any party. Both the encryptor and the decryptor know that such special derivatives are shared between them without knowing the exact value of these special derivatives. Two special derivatives are used in the key agreement mechanism, which are denoted by $[q_1]_n$ and $[q_2]_n$, respectively. Both derivatives $[q_1]_n$ and $[q_2]_n$ are shared between the encryptor and decryptor with their values being unknown to any party.

The construction of the first special derivative $[q_1]_n$ requires that each of the encryptor and the decryptor possesses two private modular integers ($[x_1]_n$ and $[x_2]_n$, and $[y_1]_n$ and $[y_2]_n$).

The first special derivative $[q_1]_n$ is defined as:

$[q_1]_n = 2 \cdot_n ([y_1]_n +_n [y_2]_n) \cdot_n [x_2]_n +_n 2 \cdot_n ([x_1]_n +_n [x_2]_n) \cdot_n [y_2]_n$ Special derivative $[q_1]_n$ mixes the private modular integers used by both parties. The value of $[q_1]_n$ can be embedded in the undisclosed derivatives through the following steps.

The initial calculation of keying materials (step 106, FIG. 2) is as follows:

Encryptor: $[e_1]_n = 2 \cdot_n ([x_1]_n +_n [x_2]_n);$

Decryptor: $[d_1]_n = 2 \cdot_n ([y_1]_n +_n [y_2]_n);$ $[e_1]_n$ and $[d_1]_n$ are each disclosed to the counter parties (step 108, FIG. 2). The disclosure of $[e_1]_n$ and $[d_1]_n$ makes them public values available to all parties, including adversaries. These disclosed keying materials are symbolized as:

$[p_1]_n = [e_1]_n$ $[p_2]_n = [d_1]_n$ $[p_3]_n = [p_1]_n \cdot_n [p_2]_n = [e_1]_n \cdot_n [d_1]_n$ Subsequent undisclosed derivatives are calculated as follows:

Encryptor:

$[e_2]_n = [x_1]_n +_n 2 \cdot_n [x_2]_n$ $[e_3]_n = [p_2]_n \cdot_n [x_1]_n = [d_1]_n \cdot_n [x_1]_n = 2 \cdot_n [y_1]_n +_n [y_2]_n \cdot_n [x_1]_n$ $[e_4]_n = [p_2]_n \cdot_n [e_1]_n = [d_1]_n \cdot_n [e_2]_n$ $[e_5]_n = [p_2]_n \cdot_n [x_2]_n = [d_1]_n \cdot_n [x_2]_n = 2 \cdot_n [y_1]_n +_n [y_2]_n \cdot_n [x_2]_n$ Decryptor:

$[d_2]_n = [y_1]_n +_n 2 \cdot_n [y_2]_n$ $[d_3]_n = [p_1]_n \cdot_n [y_1]_n = [e_1]_n \cdot_n [y_1]_n = 2 \cdot_n [x_1]_n +_n [x_2]_n \cdot_n [y_1]_n$ $[d_4]_n = [p_1]_n \cdot_n [d_2]_n = [e_1]_n \cdot_n [d_2]_n$ $[d_5]_n = [p_1]_n \cdot_n [y_2]_n = [e_1]_n \cdot_n [y_2]_n = 2 \cdot_n [x_1]_n +_n [x_2]_n \cdot_n [y_2]_n$ Thus, $[q_1]_n$ can be defined (step 108, FIG. 2) as $$[q_1]_n = [e_5]_n +_n [d_5]_n = [p_2]_n \cdot_n [x_2]_n +_n [p_1]_n \cdot_n [y_2]_n$$

$$= [d_1]_n \cdot_n [x_2]_n +_n [e_1]_n \cdot_n [y_2]_n$$

$$= 2 \cdot_n [y_1]_n +_n [y_2]_n \cdot_n [x_2]_n +_n 2 \cdot_n [x_1]_n +_n [x_2]_n \cdot_n [y_2]_n$$

Since the private integers $[y_1]_n$ and $[y_2]_n$ have not been disclosed, the value of $[q_1]_n$ is unknown to either party. Instead, each of the two parties only knows a portion of the value of $[q_1]_n$. The value of $[q_1]_n$ is the sum of the two partial values. Furthermore, it can be verified that the following equations are satisfied:

$$[p_3]_n = [d_1]_n \cdot_n [e_1]_n = 4 \cdot_n ([x_1]_n +_n [x_2]_n) \cdot_n ([y_1]_n +_n [y_2]_n)$$

$$= [q_1]_n +_n [e_3]_n +_n [d_3]_n$$

$$[d_4]_n = [e_1]_n \cdot_n [d_2]_n = [p_3]_n -_n [d_3]_n = [q_1]_n +_n [e_3]_n.$$

$$[e_4]_n = [d_1]_n \cdot_n [e_2]_n = [p_3]_n -_n [e_3]_n = [q_1]_n +_n [d_3]_n.$$

The special derivative $[q_2]_n$ can be used to construct the second special derivative $[q_2]_n$. The construction of the second special derivative $[q_2]_n$ requires the two parties to use additional private modular integers ($[x_3]_n$ and $[y_3]_n$). $[q_2]_n$ can be expressed as:

$$[q_2]_n = 3 \cdot_n [d_3]_n \cdot_n [e_1]_n +_n ([q_1]_n ([d_3]_n +_n [y_3]_n +_n [e_3]_n +_n [x_3]_n) +_n [$$

$$x_3]_n \cdot_n [y_3]_n$$

The expression of $[q_2]_n$ mixes the private modular integers used by the two parties, and the value of $[q_2]_n$ is unknown to either party. The value of $[q_2]_n$ can be embedded in the undisclosed derivatives calculated by the two parties. Embedding the unknown in the undisclosed derivatives requires each party to calculate a keying material and send it to the counter party. The calculation and exchange of a keying material (step 110, FIG. 2) is as follows:

Encryptor: $[e_6]_n = [e_3]_n -_n [x_3]_n$

Decryptor: $[d_6]_n = [d_3]_n -_n [y_3]_n$ $[e_6]_n$ and $[d_6]_n$ are disclosed to the counter parties (step 112, FIG. 2). Thus, the further public values are:

$$[p_4]_n = [d_6]_n$$

$$[p_5]_n = [e_6]_n$$

The value of $[q_2]_n$ can be embedded in the undisclosed derivatives through the following calculations:

Encryptor:

$$[e_7]_n = \{2 \cdot_n [p_3]_n -_n [p_4]_n +_n ([e_3]_n +_n [x_3]_n)\} \cdot_n [e_4]_n -_n [x_3]_n \cdot_n [p_4]_n$$

$$[e_8]_n = [e_7]_n +_n ([e_3]_n)^2 -_n ([e_4]_n)^2$$

Decryptor:

$$[d_7]_n = \{2 \cdot_n [p_3]_n -_n [p_5]_n +_n ([d_3]_n +_n [y_3]_n)\} \cdot_n [d_4]_n -_n [y_3]_n \cdot_n [p_5]_n$$

$$[d_8]_n = [d_7]_n +_n ([d_3]_n)^2 -_n ([d_4]_n)^2$$

It can be shown that:

$$[e_8]_n = ([d_4]_n)^2 +_n [d_3]_n \cdot_n [y_3]_n +_n [q_2]_n$$

$$[d_8]_n = ([e_4]_n)^2 +_n [e_3]_n \cdot_n [x_3]_n +_n [q_2]_n$$

Calculation of the common key requires the two honest parties to exchange additional keying materials. The construction of the additional keying materials requires the two parties to use additional private modular integers ($[x_4]_n$ and $[y_4]_n$). The additional keying materials are calculated (step 114, FIG. 2) as follows:

Encryptor:

$$[e_9]_n = [e_4]_n -_n [p_4]_n = [e_4]_n -_n [d_6]_n = [q_1]_n +_n [y_3]_n$$

$$[e_{10}]_n = [x_3]_n \cdot_n [e_9]_n +_n [e_3]_n \cdot_n [e_4]_n +_n [e_3]_n \cdot_n [p_4]_n +_n [x_4]_n$$

Decryptor:

$$[d_9]_n = [d_4]_n -_n [p_5]_n = [d_4]_n -_n [e_6]_n = [q_1]_n +_n [x_3]_n$$

$$[d_{10}]_n = [y_3]_n \cdot_n [d_9]_n +_n [d_3]_n \cdot_n [d_4]_n +_n [d_3]_n \cdot_n [p_5]_n +_n [y_4]_n$$

Then, the encryptor and decryptor disclose $[d_{10}]_n$ and $[e_{10}]_n$, as keying materials to the counter parties, respectively. Thus, the further public values are:

$$[p_6]_n = [d_{10}]_n$$

$$[p_7]_n = [e_{10}]_n$$

Based on the keying material received from the counter-party, each party calculates the common key (step 116, FIG. 2) through the following steps. The encryptor calculates the common key through calculation the following derivatives:

$$[e_{11}]_n = ([e_3]_n +_n [x_3]_n) \cdot_n [e_4]_n$$

$$[e_{12}]_n = [e_{11}]_n +_n [p_6]_n = [q_2]_n +_n [y_4]_n$$

$$[e_{13}]_n = [e_8]_n -_n [e_{12}]_n = ([d_4]_n)^2 +_n [d_3]_n \cdot_n [y_3]_n -_n [y_4]_n$$

$$[e_{14}]_n = ([e_4]_n)^2 +_n [e_3]_n \cdot_n [x_3]_n -_n [x_4]_n$$

The value of the common key $[K]_n$ is derived by the encryptor as:

$$[K]_n = [e_{13}]_n \cdot_n [e_{14}]_n =$$

$$\{([d_4]_n)^2 +_n [d_3]_n \cdot_n [y_3]_n -_n [y_4]_n\} \cdot_n \{([e_4]_n)^2 +_n [e_3]_n \cdot_n [x_3]_n -_n [x_4]_n)\}$$

The decryptor calculates the common key through the following derivatives:

$$[d_{11}]_n = ([d_3]_n +_n [y_3]_n) \cdot_n [d_4]_n$$

$$[d_{12}]_n = [d_{11}]_n +_n [p_7]_n = [q_2]_n +_n [x_4]_n$$

$$[d_{13}]_n = [d_8]_n -_n [d_{12}]_n = ([e_4]_n)^2 +_n [e_3]_n \cdot_n [x_3]_n -_n [x_4]_n$$

$$[d_{14}]_n = ([d_4]_n)^2 +_n [d_3]_n \cdot_n [y_3]_n -_n [y_4]_n$$

The value of the common key $[K]_n$ is derived by the decryptor as:

$$[K]_n = [d_{13}]_n \cdot_n [d_{14}]_n =$$

$$\{([e_4]_n)^2 +_n [e_3]_n \cdot_n [x_3]_n -_n [x_4]_n\} \cdot_n \{([d_4]_n)^2 +_n [d_3]_n \cdot_n [y_3]_n -_n [y_4]_n)\}$$

Thus, $[K]_n$ is calculable by both parties, but undeterminable for any adversaries. For the above example embodiment, keying materials can be exchanged between the encryptor and deeryptor through conducting a three-way handshake, as illustrated in FIG. 3. In order to fit the exchange of keying materials into the 3-way handshake, some modifications on the above calculations of the derivatives are needed.

A three-way handshake is used to allow an encryptor and a decryptor to exchange the keying materials that are needed for calculating a common key. The encryptor initiates the three-way handshake by sending a message $h_1$ to the decryptor. Keying materials $[e_1]_n$ and $[e_6]_n$ are encapsulated in this message, which is calculated (step 206, FIG. 3) as:

$$[e_1]_n = 2 \cdot_n ([x_1]_n +_n [x_2]_n);$$

$$[e'_6]_n = [x_1]_n -_n [x_3]_n$$

Thus, the first public values, enclosed in the first message $h_1$ to the decryptor (step 208, FIG. 3), are:

$$[p_1]_n = [e_1]_n$$

$$[p'_5]_n = [e'_6]_n$$

Upon receiving the first message $h_1$, the following calculations are performed (step 210, FIG. 3):

$$[d_1]_n = 2 \cdot_n ([y_1]_n +_n [y_2]_n)$$

$$[e_6]_n = [p'_5]_n \cdot_n [d_1]_n = [e'_6]_n \cdot_n [d_1]_n = [e_3]_n -_n [d_1]_n \cdot_n [x]_n$$

$$[d_2]_n = [y_1]_n +_n 2 \cdot_n [y_2]_n$$

$$[d_3]_n = [p_1]_n \cdot_n [y_1]_n = [e_1]_n \cdot_n [y_1]_n = 2 \cdot_n ([x_1]_n +_n [x_2]_n) \cdot_n [y_1]_n$$

$$[d_4]_n = [p_1]_n \cdot_n [d_2]_n = [e_1]_n \cdot_n [d_2]_n$$

$$[d_5]_n = [p_1]_n \cdot_n [y_2]_n = [e_1]_n \cdot_n [y_2]_n = 2 \cdot_n ([x_1]_n +_n [x_2]_n) \cdot_n [y_2]_n$$

$$[d_6]_n = [d_3]_n -_n [y_3]_n$$

$$[d_9]_n = [d_4]_n -_n [p_5]_n = [d_4]_n -_n [e_6]_n = [q_1]_n +_n [x_3]_n$$

$$[d_{10}]_n = [y_3]_n \cdot_n [d_9]_n +_n [d_3]_n \cdot_n [d_4]_n +_n [d_3]_n \cdot_n [p_5]_n +_n [y_4]_n$$

The decryptor discloses the values of $[d_1]_n$, $[d_6]_n$, and $[d_{10}]_n$ as keying materials to the encryptor in a second message $h_2$ (step 212, FIG. 3). Thus, the public values disclosed in $h_2$ are as follows:

$$[p_2]_n = [d_1]_n$$

$$[p_3]_n = [p_1]_n \cdot_n [p_2]_n = [e_1]_n \cdot_n [d_1]_n$$

$$[p_4]_n = [d_6]_n$$

$$[p_5]_n = [p'_5]_n \cdot_n [p_2]_n = [e'_6]_n \cdot_n [d_1]_n = [e_3]_n -_n [d_1]_n \cdot_n [x_3]_n$$

$$[p_6]_n = [d_{10}]_n$$

Upon receiving handshake message $h_2$, the encryptor accepts the values of $[d_1]_n$, $[d_6]_n$, and $[d_{10}]_n$ and calculates derivatives based on its own private modular integers and the keying materials from the received message $h_2$ (step 214, FIG. 3). First, the encryptor calculates the following derivatives:

$$[e_2]_n = [x_1]_n + 2 \cdot_n [x_2]_n$$

$$[e_3]_n = [p_2]_n \cdot_n [x_1]_n = [d_1]_n \cdot_n [x_1]_n = 2 \cdot_n ([y_1]_n +_n [y_2]_n) \cdot_n [x_1]_n$$

$$[e_4]_n = [p_2]_n \cdot_n [e_2]_n = [d_1]_n \cdot_n [e_2]_n$$

$$[e_5]_n = [p_2]_n \cdot_n [x_2]_n = [d_1]_n \cdot_n [x_2]_n = 2 \cdot_n ([y_1]_n +_n [y_2]_n) \cdot_n [x_2]_n$$

$$[e_6]_n = [e'_6]_n \cdot_n [p_2]_n = [e'_6]_n \cdot_n [d_1]_n = [e_3]_n -_n [d_1]_n \cdot_n [x_3]_n =$$

$$[p_5]_n$$

$$[e_7]_n = \{2 \cdot_n [p_3]_n -_n [p_4]_n +_n ([e_3]_n +_n [x_3]_n)\} \cdot_n [e_4]_n -_n [x_3]_n \cdot_n [p_4]_n$$

$$[e_8]_n = [e_7]_n +_n ([e_3]_n)^2 -_n ([e_4]_n)^2$$

$$[e_9]_n = [e_4]_n -_n [p_4]_n = [e_4]_n -_n [d_6]_n = [q_1]_n +_n [y_3]_n$$

$$[e_{10}]_n = [d_1]_n \cdot_n [x_3]_n \cdot_n [e_9]_n +_n [e_3]_n \cdot_n [e_4]_n +_n [e_3]_n \cdot_n [p_4]_n +_n [x_4]_n$$

The notion of $[q_1]_n$, the first special derivative, is expressed as:

$$[q_1]_n = [e_5]_n +_n [d_5]_n = [p_2]_n \cdot_n [x_2]_n +_n [p_1]_n \cdot_n [y_2]_n =$$

$$[d_1]_n \cdot_n [x_2]_n +_n [e_1]_n \cdot_n [y_2]_n =$$

$$2 \cdot_n ([y_1]_n +_n [y_2]_n) \cdot_n [x_2]_n +_n 2 \cdot_n ([x_1]_n +_n [x_2]_n) \cdot_n [y_2]_n$$

The encryptor discloses derivatives $[e_6]_n$ and $[e_9]_n$ as keying materials in a third message $h_3$ (step 216, FIG. 3), which is sent to the decryptor. After the value of $[e_{10}]_n$ has been disclosed, this public value is symbolized as:

$$[p_7]_n = [e_{10}]_n$$

Upon receiving third handshake message $h_3$, the decryptor accepts the value of $[e_{10}]_n$ and calculates further derivatives based on its own private modular integers and these keying materials, To calculate the common key (step 218, FIG. 3), the decryptor first calculates the following derivatives:

$$[d_7]_n = \{2 \cdot_n [p_3]_n -_n [p_5]_n +_n ([d_3]_n +_n [y_3]_n)\} \cdot_n [d_4]_n -_n [y_3]_n \cdot_n [p_5]_n$$

$$[d_8]_n = [d_7]_n +_n ([d_3]_n)^2 -_n ([d_4]_n)^2$$

It can be shown that:

$$[d_8]_n = ([e_4]_n)^2 +_n [e_3]_n \cdot_n [d_1]_n \cdot_n [x_3]_n +_n [q'_2]_n$$

The notion of $[q'_2]_n$ is expressed as:

$$[q'_2]_n = 3 \cdot_n [d_3]_n \cdot_n [e_3]_n +_n [q_1]_n ([d_3]_n +_n [y_3]_n +_n [e_3]_n +_n [d_1]_n \cdot_n [x_3]_n) +_n [$$

$$d_1]_n \cdot_n [x_3]_n \cdot_n [y_3]_n$$

Then, the decryptor calculates the common key through the following derivations:

$$[d_{11}]_n = ([d_3]_n +_n [y_3]_n) \cdot_n [d_4]_n$$

$$[d_{12}]_n = [d_{11}]_n +_n [p_7]_n = [q'_2]_n +_n [x_4]_n$$

$$[d_{13}]_n = [d_8]_n -_n [d_{12}]_n = ([e_4]_n)^2 +_n [e_3]_n \cdot_n [x_3]_n -_n [x_4]_n$$

$$[d_{14}]_n = ([d_4]_n)^2 +_n [d_3]_n \cdot_n [y_3]_n -_n [y_4]_n$$

The value of the common key $[K]_n$ is derived by the decryptor as:

$$[K]_n = [d_{13}]_n \cdot_n [d_{14}]_n =$$

$$\{([e_4]_n)^2 +_n [e_3]_n \cdot_n [d_1]_n \cdot_n [x_3]_n -_n [x_4]_n\} \cdot_n \{([d_4]_n)^2 +_n [d_3]_n \cdot_n [y_3]_n -_n [y_4]_n)\}$$

The encryptor calculates the common key through the following derivations. First, it can be shown that:

$$[e_8]_n = ([d_4]_n)^2 +_n [d_3]_n \cdot_n [y_3]_n +_n [q'_2]_n$$

The encryptor calculates the common key as follows:

$$[e_{11}]_n = ([e_3]_n +_n [d_1]_n \cdot_n [x_3]_n) \cdot_n [e_4]_n$$

$$[e_{12}]_n = [e_{11}]_n +_n [p_6]_n = [q'_2]_n +_n [y_4]_n$$

$$[e_{13}]_n = [e_8]_n -_n [e_{12}]_n = ([d_4]_n)^2 +_n [d_3]_n \cdot_n [y_3]_n -_n [y_4]_n$$

$$[e_{14}]_n = ([e_4]_n)^2 +_n [e_3]_n \cdot_n [d_1]_n \cdot_n [x_3]_n -_n [x_4]_n$$

The value of the common key [K]$_n$ is derived by the encryptor as:

$$[K]_n = [e_{13}]_n \cdot_n [e_{14}]_n =$$

$$\{([d_4]_n)^2 +_n [d_3]_n \cdot_n [y_3]_n -_n [y_4]_n\} \cdot_n \{([e_4]_n)^2 +_n [e_3]_n \cdot_n [d_1]_n \cdot_n [x_3]_n -_n [x_4]_n)\}$$

Thus, $[K]_n$ can be calculated by both the encryptor and decryptor using a three-way handshake. The public messages $h_1$-$h_3$ represent an underdetermined series of equations so any adversary would be unable to calculate the common key $[K]_n$ using only the public messages $h_1$-$h_3$. The above examples represent one possible embodiment. However, other embodiments may be contemplated for performing a key exchange based on an underdetermined system of equations.

Although the present invention has been described with reference to preferred embodiments, workers skilled in the art will recognize that changes may be made in form and detail without departing from the spirit and scope of the invention.

The invention claimed is:

1. A method of performing a key exchange between a first computing system and a second computing system, the method comprising:
    implementing a message exchange scheme between the first and second computing system, wherein each of the first and second computing systems includes at least a processor and a memory;
    generating, by the first computing system, first private modular integers that remain undisclosed to any other parties;
    generating, by the second computing system, second private modular integers that remain undisclosed to any other parties;
    calculating, by each of the first and the second computing systems, a number of keying materials;
    exchanging the keying materials as public messages between the first and second computing system, wherein the collection of the public messages forms an underdetermined system of equations in variables of the first and the second private modular integers; and
    calculating, by the first and the second computing systems, the common key based on the public messages, and the first and the second private modular integers.

2. The method of claim 1, wherein exchanging the keying materials as public messages comprises executing a three-way handshake between the first and second computing systems that includes first, second, and third public messages.

3. The method of claim 2, wherein the three-way handshake comprises:
    generating, by the first computing system, first keying materials based on the first private modular integers;
    providing the first keying materials to the second computing system as first public message;
    generating, by the second computing system, second keying materials based on the second private modular integers and the first keying materials;
    providing the second keying materials to the first computing system as the second public message;
    generating, by the first computing system, third keying material based on second private modular integers and the second keying materials; and
    providing the third keying materials to the second computing system as the third public message.

4. The method of claim 3, wherein calculating, by the first and second computing systems, the common key comprises:
    calculating, by the first computing system, the common key using the first private modular integers and the second keying materials; and
    calculating, by the second computing system, the common key using the second private modular integers and the third keying material.

5. The method of claim 4, wherein first private modular integers comprise four modular integers.

6. The method of claim 5, wherein the second private modular integers comprise four modular integers.

7. The method of claim 6, wherein the first, the second, and the third keying materials comprise polynomial combinations of the first private modular integers and the second private modular integers.

8. The method of claim 7, wherein the polynomial combinations are calculated using simple modular arithmetic operations that include modular additions/subtractions and modular multiplications and do not include modular exponentiation operations.

9. A system comprising:
    are encryptor that comprises a first processor and a first memory;
    a decryptor that comprises a second processor and a second memory; and
    a communication link, wherein the encryptor and the decryptor communicate data via the communication link;
    wherein the first and the second memories are encoded with instructions that when executed by the first and the second processors, respectively, the encryptor and the decryptor:
        exchange public messages comprising keying materials; and
        calculate a common key based on the keying materials, first private modular integers known only to the encryptor, and second private modular integers known only to the decryptor;
        wherein the keying materials disclosed in public messages form an under-determined system of equations in variables of the first and the second private modular integers.

10. The system of claim 9, wherein the first private modular integers are a plurality of first values stored in the first memory and not disclosed to any other party, and the second private modular integers are a plurality of second values stored in the second memory and not disclosed to any other party.

11. The system of claim 10, wherein the keying materials are generated using the first private modular integers and the second private modular integers.

12. The system of claim 11, wherein the first and the second memories are further encoded with instructions that when executed by the first and the second processors, respectively, the encryptor and the decryptor perform a three-way handshake that includes first, second, and third public messages.

13. The system of claim 12, wherein the first and the second memories are further encoded with instructions that when executed by the first and the second processors, respectively, the encryptor and the decryptor perform the three-way handshake by:
    generating, by the encryptor, first keying materials based on the first private modular integers;

sending, by the encryptor via the communication link, the first keying materials to the decryptor in the first public message;

generating, by the decryptor, second keying materials based on the second private modular integers and the first keying materials;

sending, by the decryptor via the communication link, the second keying materials to the encryptor in the second public message;

generating, by the encryptor, third keying material based on the second private modular integers and the second keying materials; and sending, by the encryptor via the communication link, the third keying material to the decryptor in the third public message;

wherein the first, the second, and the third keying materials comprise polynomial combinations of the first and second private modular integers.

14. The system of claim 13, wherein the first and second memories are further encoded with instructions that when executed by the first and the second processors, respectively, the encryptor calculates the common key using the first private modular integers and the keying materials, and the decryptor calculates the common key using the second private modular integers and the keying materials.

15. The system of claim 14, wherein first private modular integers comprise four modular integers.

16. The system of claim 15, wherein the second private modular integers comprise four modular integers.

17. The system of claim 16, wherein the first, the second, and the third keying materials comprise polynomial combinations of first and second private modular integers.

18. The system of claim 17, wherein the first and the second memories are further encoded with instructions that when executed by the first and the second processors, respectively, the encryptor and the decryptor calculate the polynomial combinations of the first and second private modular integers using simple modular arithmetic that includes modular additions/subtractions and modular multiplications, with the modulus being a positive integer greater than one.

* * * * *